(12) United States Patent
Wang

(10) Patent No.: US 6,403,736 B1
(45) Date of Patent: *Jun. 11, 2002

(54) ETHYLENE POLYMERIZATION PROCESS

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/593,878

(22) Filed: Jun. 14, 2000

(51) Int. Cl.$^7$ .................................................. C08F 4/44
(52) U.S. Cl. ........................ 526/160; 526/134; 526/943; 526/941; 526/348; 502/104; 502/114
(58) Field of Search ................................ 526/160, 170, 526/153, 943

(56) References Cited

U.S. PATENT DOCUMENTS

| | | | |
|---|---|---|---|
| 5,444,134 A | * 8/1995 | Matsumoto ................. 526/159 |
| 5,554,775 A | 9/1996 | Krishnamurti et al. ......... 556/7 |
| 5,637,659 A | 6/1997 | Krishnamurti et al. ...... 526/133 |
| 5,744,417 A | 4/1998 | Nagy et al. ................. 502/155 |
| 5,747,404 A | 5/1998 | Nagy et al. ................. 502/104 |
| 5,756,611 A | 5/1998 | Etherton et al. ............. 526/127 |
| 5,859,157 A | 1/1999 | Gupte et al. .................. 526/88 |
| 6,034,027 A | 3/2000 | Krishnamurti et al. ...... 502/200 |
| 6,201,076 B1 | * 3/2001 | Etherton et al. ............... 526/74 |
| 6,211,311 B1 | * 4/2001 | Wang et al. ................. 526/131 |

OTHER PUBLICATIONS

U.S. Application No. 09/318,009; filed May 25, 1999; Inventor: S. Wang; Process For The In–Situ Preparation Of Single–Site Transition Metal Catalysts and Polymerization Process.

U.S. Application No. 09/593,875; filed Jun. 14, 2000; Inventor: C. C. Meverden Olefin Polymerization Process For Producing Broad MWD Polymers.

* cited by examiner

*Primary Examiner*—David W. Wu
*Assistant Examiner*—Rip A Lee
(74) *Attorney, Agent, or Firm*—Shao Guo

(57) ABSTRACT

An ethylene polymerization process is disclosed. The process uses a single-site catalyst that contains a boraaryl ligand. The catalyst is premixed with alkyl aluminum to reduce the induction time of the catalyst. In addition, premixing the catalyst with triethyl aluminum significantly enhances the bulk density of polyethylene.

10 Claims, No Drawings

ETHYLENE POLYMERIZATION PROCESS

FIELD OF THE INVENTION

The invention relates to ethylene polymerization by single-site catalysts. More particularly, the invention relates to a process that reduces the induction time of the catalyst and produces polyethylene having a high bulk density.

BACKGROUND OF THE INVENTION

Single-site catalysts are known. They can be divided into metallocene and non-metallocene. Metallocene single-site catalysts are transition metal compounds that contain cyclopentadienyl (Cp) or Cp derivative ligands. Non-metallocene single-site catalysts are referred to as those that contain ligands other than Cp but have the same catalytic characteristics as the metallocene. The non-metallocene single-site catalysts usually contain heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) and quinolinyl (see. U.S. Pat. No. 5,637,660). Single-site catalysts produce polyethylene of many properties that are not available to those made by Ziegler catalysts, for example, narrow molecular weight distribution and low density.

Successful production of polyethylene with the newly developed single-site catalysts offers many challenges. First, often the catalysts need to be modified for the desired activity and stability. For example. co-pending U.S. application Ser. No. 09/318,009 (U.S. Pat. No. 6,291,386) teaches in-situ alkylation of a single-site catalyst by reacting the catalyst that has at least one labile ligand with alkyl aluminum in the polymerization system. The labile ligand is removed and replaced by the alkyl group resulting in the catalyst having improved stability and activity. However, the in-situ alkylation increases the induction time of the catalyst, i.e., the time needed for the catalyst to start the polymerization.

Furthermore, polyethylene and other olefin polymers made by single-site catalysts are highly desirable if they can be processed in the existing thermal processing equipment. Many thermal processes including blowing film extrusion, injection molding and blow molding require polyethylene to have a relatively high bulk density (usually greater than about 0.30 $g/cm^3$). Low bulk density gives a low production rate and also can result in inferior product quality. Bulk density also affects ethylene polymerization. Low bulk density means low productivity per reactor unit. Polyethylene of low bulk density also dries slowly because it absorbs solvent and residual monomers.

One approach to shorten the induction time of the catalyst is to premix the catalyst with alkyl aluminum right before being added into the polymerization system. However, this approach results in a lower bulk density of polyethylene. Very surprisingly, I have found that premixing the catalyst with triethyl aluminum can retain high bulk density of polyethylene while shortening the induction time.

SUMMARY OF THE INVENTION

The invention is an ethylene polymerization process. The process uses a single-site catalyst that contains at least one boraaryl ligand. The process includes supporting the catalyst, premixing the supported catalyst with alkyl aluminum, and polymerizing ethylene in the presence of the catalyst. Premixing the catalyst with alkyl aluminum significantly reduces the induction time of the catalyst.

The invention also includes a process that produces polyethylene of a bulk density greater than about 0.30 $g/cm^3$. I have found that premixing the catalyst with triethyl aluminum not only reduces the induction time of the catalyst but also retains or enhances the bulk density of polyethylene.

DETAILED DESCRIPTION OF THE INVENTION

The process of the invention includes supporting a single-site catalyst. The single-site catalyst is a Group 3-10 metal compound that contains at least one boraaryl ligand. Preferably, the metal is titanium, zirconium, or hafnium. Zirconium is particularly preferred. The boraaryl ligand includes substituted or non-substituted borabenzene, boranaphthalene, boraanthracene, and boraphenanthrene. Preferably, the boraaryl ligand is borabenzene or substituted borabenzene, e.g., 1-methylborabenzene. U.S. Pat. Nos. 5,554,775, 5,637,659, and 6,034,027, the teachings of which are herein incorporated by reference, teach how to prepare catalysts that contain a boraaryl ligand.

In addition to a boraaryl ligand, other ligands are used. The total number of ligands satisfies the valence of the transition metal. The ligands can be bridged or non-bridged. Other suitable ligands include substituted or non-substituted cyclopentadienyls, indenyls, fluorenyls, halides, $C_1$–$C_{10}$ alkyls, $C_6$–$C_{15}$ aryls, $C_7$–$C_{20}$ aralkyls, dialkylamino, siloxy, alkoxy, and the like, and mixtures thereof. Cyclopentadienyls and indenyls are preferred.

Suitable ligands also include other heteroatomic ligands such as pyrrolyl, azaborolinyl, and quinolinyl. Methods for preparing heteroatomic ligand-containing single-site catalysts are available in the literature. For example, U.S. Pat. Nos. 5,539,124, 5,756,611, and 5,637,660, the teachings of which are herein incorporated by reference, teach how to make single-site catalysts that contain pyrrolyl, azaborolinyl, and quinolinyl ligands.

Examples of boraaryl-based single-site catalysts are (borabenzene)(cyclopentadienyl)zirconium dichloride, (1-methylborabenzene)(cyclopentadienyl)zirconium dichloride, (borabenzene)(indenyl)zirconium dichloride, (1-methylborabenzene) (indenyl)zirconium dichloride, (boranaphthalene)(cyclopentadienyl)zirconium dichloride, and (boraanthracene)(cyclopentadienyl)zirconium dichloride.

The catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Preferably, the support has a surface area in the range of about 10 to about 700 $m^2/g$, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment, the support is preferably heated at a temperature from about 50° C. to about 800° C. Suitable chemical modifiers include organoaluminum, organosilicon, organomagnesium, and organoboron compounds.

The catalysts are supported using any known techniques. For example, U.S. Pat. Nos. 5,747,404 and 5,744,417, the teachings of which are incorporated herein by reference, teach how to support single-site catalysts onto a polysiloxane or a silylamine polymer. In one suitable method, the single-site catalyst is dissolved in a solvent and combined with the support. Evaporation of the solvent gives a supported catalyst.

The catalyst is used with an activator. Activators can be mixed and supported together with single-site catalysts on a support or added separately to the polymerization reactor. Suitable activators include anionic compounds of boron and aluminum, trialkylboron and triarylboron compounds, and the like. Examples are lithium tetrakis (pentafluorophenyl) borate, triphenylcarbenium tetrakis(pentafluorophenyl) borate, lithium tetrakis(pentafluorophenyl)aluminate, tris (pentafluorophenyl)boron, tris(pentabromophenyl)boron, and the like. Activators are generally used in an amount within the range of about 0.01 to about 100,000, preferably from about 0.1 to about 1,000, and most preferably from about 0.5 to about 300, moles per mole of the single-site catalyst.

The process of the invention includes premixing the supported catalyst with trialkyl aluminum, $AlR_3$, where R has 1 to 10 carbons. Examples of suitable alkyl aluminum include trimethyl aluminum (TMA), triethyl aluminum (TEAL) and triisobutyl aluminum (TIBAL). Without the premixing the catalyst with trialkyl aluminum, the catalyst has about eight minutes of induction time, which means that the catalyst does not start the polymerization until eight minutes after the catalyst is added. Such a long induction time is unacceptable in a commercial process, especially in a continuous process. When the catalyst is premixed with alkyl aluminum, the induction time is about 1 to 2 minutes. The molar ratio of trialkyl aluminum to the catalyst is preferably within the range of about 1 to about 500, more preferably from about 10 to about 300 and most preferably from about 50 to about 200. The premixing is preferably performed right prior to the polymerization. Aging the premixed catalyst may reduce its effectiveness in reducing the induction time.

I have also surprisingly found that premixing the catalyst with alkyl aluminum other than TEAL, such as TIBAL and TMA, although it reduces the induction time of the catalyst, significantly lowers the bulk density of polyethylene. More surprisingly, by premixing the catalyst with TEAL, the bulk density of polyethylene produced remains greater than about 0.30 g/cm$^3$ while the induction time of the catalyst is shortened to about 1–2 minutes. The molar ratio of TEAL to the catalyst is preferably within the range of about 1 to about 500, more preferably from about 10 to about 300 and most preferably from 50 to 200.

The process of the invention includes polymerizing ethylene in the presence of the catalyst premixed with alkyl aluminum. The polymerization can be conducted in either gas phase or slurry phase. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail a gas phase polymerization of ethylene with a Ziegler catalyst. The slurry-phase polymerization is performed in an organic solvent that can disperse the catalyst and polyethylene. Suitable solvents include $C_4$ to $C_{10}$ linear, branched, and cyclic aliphatic, and $C_6$–$C_{12}$ aromatic hydrocarbons. Examples of suitable solvents are butane, hexane, cyclohexane, octane, isobutane, and toluene.

The polymerization is preferably conducted under pressure. The pressure is preferably in the range of about 150 to about 15,000 psi, more preferably from about 200 to about 5,000 psi, and most preferably from about 200 to about 2,000 psi. Generally, the higher the pressure, the more productive the process. Laboratory operations are conducted under relatively low pressure for safety reasons. Polymerization temperature is preferably within the range from 30° C. to 250° C., more preferably from 50° C. to 150° C.

Chain transfer agents such as hydrogen can be used to control the molecular weight of the product. The proportion of hydrogen used can be varied. For example, if less hydrogen is used, a higher molecular weight polymer will be produced.

A scavenger is preferably used in the polymerization. Scavengers reduce the effect of a trace amount of moisture and oxygen existing in the reactor on the polymerization and increase the activity and lifetime of the catalysts. Suitable scavengers include alkyl aluminum compounds. Scavengers are added into the reactor prior to the addition of the catalyst in an amount within the range of 1 to about 500 times the catalyst weight.

Ethylene polymers made by the process include polyethylene and copolymers of ethylene with a $C_3$–$C_{10}$ α-olefin. Suitable α-olefins include propylene, 1-butene, 1-hexene, and 1-octene, and the like, and mixtures thereof. The molar ratio of ethylene/α-olefin is within the range of about 70/30 to 100/0. The invention produces ethylene polymers having a bulk density greater than about 0.30 g/cm$^3$. The polymers are widely used in the industry for making polyethylene films, sheets, molded parts, and other products.

The following examples merely illustrate the invention. Those skilled in the art will recognize many variations that are within the spirit of the invention and scope of the claims.

EXAMPLE 1

Modification of Silica Support

Hexamethyldisilazane (12.5 parts) is slowly added to Davison 948 silica (100 parts, product of Davison Chemical Company) with stirring for two hours at 25° C. The treated silica is dried at 150° C. for 6 hours in a fluidized bed dryer with nitrogen flow, and then dispersed in heptane (3.5 mL heptane/g silica) to form a slurry. Triethylboron (24.5 parts, product of Aldrich, 95+%) is slowly added to the slurry with stirring. The slurry is heated and refluxed at 100° C. for 6 hours and then cooled to 25° C. The modified support is isolated by removing the solvent and dried under vacuum.

Preparation of Catalyst

Cyclopentadienyl(1-methylborabenzene)zirconium dichloride (42 mg, 0.131 mmol) and trityl tetrakis(pentafluorophenyl)borate (169 mg, 0.183 mmol) are dissolved in toluene (8 mL). The solution is added to the modified support (1.20 grams) with stirring at 25° C. for 50 minutes. The supported catalyst is dried under vacuum at 25° C. for 5 hours. It contains 0.848 wt % of zirconium.

Polymerization

Fatty amine (4 g, Armostat® 710, product of Akzo Chemical) and 1-hexene (20 mL) are charged into a 1 L stainless-steel autoclave. Triethyl aluminum (TEAL) (0.25 mL of 1.0 M solution in heptane) is then flushed to the reactor by isobutane (about 350 mL). Ethylene is added to the reactor to 400 psig total pressure. The reactor contents are heated to 70° C. The supported catalyst (12 mg) is mixed with TEAL (0.13 mL, 1.0 M in heptane) in an injector at 25° C. for 12 minutes and then injected into the reactor with about 50 mL of isobutane. The polymerization starts in about one minute after the addition of the catalyst. The reaction is carried out at 70° C. for 30 minutes. The polymer is collected after the solvent is vented from the reactor; it is then dried in a vacuum oven to a constant weight. The catalyst activity is calculated by dividing the weight of polymer by the weight of catalyst and the reaction time; it is 929 kilograms of polymer per gram of catalyst per hour. The polymer has a bulk density of 0.33 g/cm$^3$.

EXAMPLE 2

The procedure of Example 1 is repeated, but in the polymerization step triisobutyl aluminum (TIBAL) instead of TEAL is added into the reactor as a scavenger prior to polymerization. The catalyst activity is 1,619 kilograms of polymer per gram of catalyst per hour. The polymer has a bulk density of 0.34 g/cm$^3$. Compared with Example 1, using TIBAL as scavenger increases the catalyst activity.

EXAMPLES 3–5

The procedure of Example 1 is repeated, but in the polymerization step, various types of alkyl aluminum specified in Table 1 rather than TEAL are used to premix with the catalyst. The bulk densities of the polymers are significantly lower compared to those in Examples 1–2 as indicated in Table 1. Compared with Examples 1 and 2 in which the catalyst is premixed with TEAL, premixing the catalyst with alkyl aluminum other than TEAL, while shortening the induction time, lowers the bulk density of polyethylene.

TABLE 1

| | Catalyst Activity and Polymer Bulk Density | | | | |
|---|---|---|---|---|---|
| No. | Alkyl Aluminum for Pre-contacting | Alkyl Aluminum Added in the Reactor | Inducing Time, minute | Catalyst Activity, kg of polymer/ g of cat. hr. | Bulk Density, g/cm$^3$ |
| 1 | TEAL | TEAL | 1 | 929 | 0.33 |
| 2 | TEAL | TIBAL | 1 | 1,619 | 0.34 |
| 3 | TIBAL | TIBAL | 1 | 2,583 | 0.28 |
| 4 | TMA | TMA | 1 | 2,471 | 0.24 |
| 5 | TIBAL | TEAL | 1 | 3,705 | 0.28 |
| C6 | ≈ | TIBAL | 8 | 1,760 | 0.31 |

COMPARATIVE EXAMPLE 6

A supported catalyst similar to Example 1 is prepared. Cyclopentadienyl(1-methylborabenzene)zirconium dichloride (27 mg, 0.085 mmole) and trityl tetrakis(pentafluorophenyl)borate (1.35 g, 0.103 mmole) are dissolved in toluene (95 mL). The solution is added to the modified support prepared in Example 1 (1.35 grams) with stirring at 25° C. for 50 minutes. The supported catalyst is dried under vacuum at 25° C. for 5 hours. It contains 0.526 wt % of zirconium.

The procedure of the polymerization step in Example 1 is followed. The catalyst prepared above is used. The catalyst is not premixed with any alkyl aluminum; TIBAL is added into the reactor prior to polymerization. Although the polymer has a high bulk density (0.31 g/cm$^3$), the polymerization does not start until eight minutes after the catalyst is injected. Such a long induction time of polymerization is not acceptable for commercial production.

I claim:
1. A process which comprises:
    (a) supporting a Group 3–10 metal catalyst that contains at least one boraaryl ligand onto a support selected from the group consisting of inorganic oxides, inorganic chlorides, and organic polymer resins;
    (b) premixing the supported catalyst with triethyl aluminum; and
    (c) polymerizing an olefin that comprises:
        i) from 70 to 100 mole % of ethylene; and
        ii) from 0 to 30 mole % of a $C_3$–$C_{10}$ α-olefin in the presence of the treated catalyst of step (b) and an activator; and in the presence of triisobutyl aluminum as a scavenger in an amount within the range of 1 to about 500 times of the treated catalyst of step (b); wherein the polymer produced has a bulk density greater than about 0.30 g/cm$^3$.
2. The process of claim 1 wherein the polymerization is conducted at a temperature within the range of about 50° C. to about 150° C.
3. The process of claim 1 wherein the $C_3$–$C_{10}$ α-olefin is selected from the group consisting of propylene, 1-butene, 1-pentene, 1-hexene, 1-octene, and mixtures thereof.

4. The process of claim 1 wherein the catalyst is cyclopentadienyl(1-methylborabenzene)zirconium dichloride.

5. The process of claim 1 wherein the activator is selected from the group consisting of anionic compounds of boron or aluminum, trialkylboron compounds, and triarylboron compounds.

6. The process if claim 1 wherein the activator is trityl tetrakis(pentafluorophenyl)borate.

7. The process of claim 1 wherein the process is performed at a pressure within the range of about 100 psi to about 5,000 psi.

8. The process of claim 1 wherein the polymer produced has a bulk density greater than about 0.35 g/cm$^3$.

9. A slurry-phase polymerization process of claim 1.

10. A gas-phase polymerization process of claim 1.

* * * * *